United States Patent

[11] 3,544,761

| | | | |
|---|---|---|---|
| [72] | Inventor | Robert A. Rosenberg<br>Dover, Massachusetts | |
| [21] | Appl. No. | 811,184 | |
| [22] | Filed | March 27, 1969<br>Division of Ser. No. 510,301, Nov. 29, 1965,<br>now Pat. No. 3,492,119 | |
| [45] | Patented | Dec. 1, 1970 | |
| [73] | Assignee | Mitron Research & Development<br>Corporation<br>Waltham, Massachusetts<br>a corporation of Delaware | |

[54] PROCESS OF WELDING ALUMINUM
2 Claims, 8 Drawing Figs.

[52] U.S. Cl. .................................................. 219/137,
219/118; 29/504

[51] Int. Cl. .................................................. B23k 9/24
[50] Field of Search .......................................... 219/118,
137, 145, 146; 75/(Inquired); 29/504

[56] References Cited
UNITED STATES PATENTS
3,443,301  5/1969  Basche et al.

*Primary Examiner*—J. V. Truhe
*Assistant Examiner*—J. G. Smith
*Attorney*—Rich & Ericson ABSTRACT: A method of welding aluminum using a filler rod of a copper-aluminum alloy containing a minor amount of elongated microfilaments of refractory material.

INVENTOR.
ROBERT A. ROSENBERG

PROCESS OF WELDING ALUMINUM

This application is a division of my pending application for Letters U.S. Pat. Ser. No. 510,301, filed by me on Nov. 29, 1965, now U.S. Pat. No. 3,492,119, for Particle Reinforcement of Metals and assigned to the assignee of this application.

My invention relates to improvement of properties of metals by way of unique internal reinforcement effects of minute particles, and, in one particular aspect, to novel and improved composite metallurgical products in which a host metal alloy, such as a lightweight aluminum alloy, is economically and conveniently caused to exhibit certain significantly enhanced physical properties such as elongation and workability, and to display heightened strength at elevated temperatures, by exceedingly small particles of guest material having a higher melting temperature than that of the alloy and having substantially uniform distribution along grain boundaries of the solidified host alloy.

It is of course a commonplace objective for the metallurgist to pursue improvement of the physical properties, economies, and convenience in processing of metals, and the mainstream of efforts along such lines has been in the direction of alloying. However, it has also been known that certain beneficial effects can be realized through inclusions of materials which are not involved in true alloying actions and which may instead serve such simple mechanical functions as filling, gross structural reinforcement, and imparting abrasive qualities or the like. Further, there have been significant advances in powder metallurgy, involving compacted and/or sintered particles of various types which together form coherent masses having characteristics which are advantageous for special purposes. By way of distinction, the present teachings are concerned with internally reinforced metals which may be cast directly from a melt, using generally conventional elementary techniques and uncomplicated low cost equipment, to form complex configurations having a high degree of structural integrity and precise dimensions, and to form billets or the like lending themselves to extensive mechanical working into a variety of shapes without serious weakening. The resulting products desirably exhibit certain characteristics of homogeneous material, although in fact they comprise metal alloy in which minute particles of higher melting point material are automatically distributed substantially uniformly, essentially along the grain boundaries as the melt solidifies. In the case of aluminum products, for example, it is well known that a commonly used alloy with about 4.5 percent copper is rather highly susceptible to hot tearing and cracking, does not well resist high temperatures, and does not lend itself to high-quality welding. In accordance with this invention, the unique addition of slightly less than about 0.30 percent, by weight, of acicular refractory (ex. silicon carbide) particles, which are about 0.5 mil long and only a few microns in diameter, significantly improves all of these characteristics.

A further object is to provide unique composite metals of substantially homogeneous character in which relatively minor amounts of minute substantially refractory particles impart improved refractory strengths and resistance to deleterious effects of high temperatures.

Still further, it is an object to provide novel and improved cast aluminum alloys in which substantially refractory minute particles of entrapped materials impede grain boundary sliding and dislocation cross slip to enhance elongation, workability, and hot-tearing characteristics, and to improve performances at relatively high temperatures, and to increase weld strengths.

By way of a summary account of practice of this invention in one of it's aspects, a quantity of molten aluminum-copper alloy (such as a popular one including 4.5 percent by weight of copper) is prepared and degassed using conventional techniques and equipment, and to this melt is added a batch of silicon carbide and/or alumina fibers. These particles are of the order of a few microns or so in diameter and may have random lengths of up to about 1 mil, and are preferably wrapped together as a package within aluminum foil and then preheated to avoid large thermal differences when the package is plunged deeply into the molten alloy. The fibers may constitute about 0.30 percent by weight of the entire melt. Preferably, a mechanical stirring is then performed, as an aid to substantially uniform dispersal of the wetted fibers throughout the melt. Thereafter, the molten material is permitted to cool and solidify, as in a mold after casting. The resulting composite material is found to resist hot tearing, cracking under high elongations and working, and high temperatures such as those of welding, and, although apparently substantially homogeneous, evidences a localizing of the added fibers at the sites of grain boundaries.

Although the features and aspects of this invention which are considered to be novel are set forth in the appended claims, further details as to preferred practices of the invention, as well as the further objects and advantages thereof, may be most readily comprehended through reference to the following description taken in connection with the accompanying drawings, wherein:

FIG. 1 presents a block diagram of steps involved in one preferred practice of the present teachings for producing improved composite materials;

Figure 5:
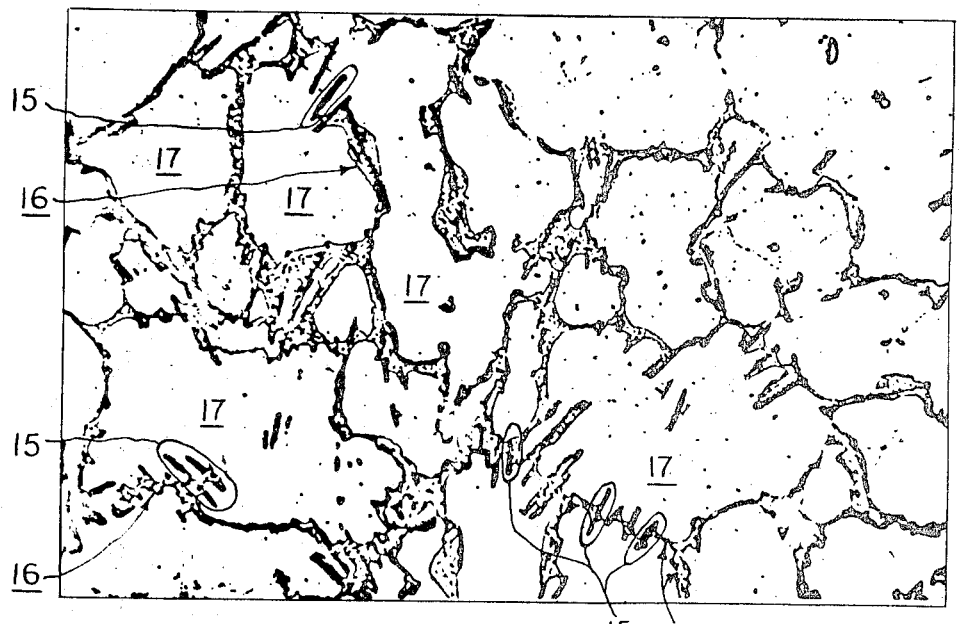
Figure 6:
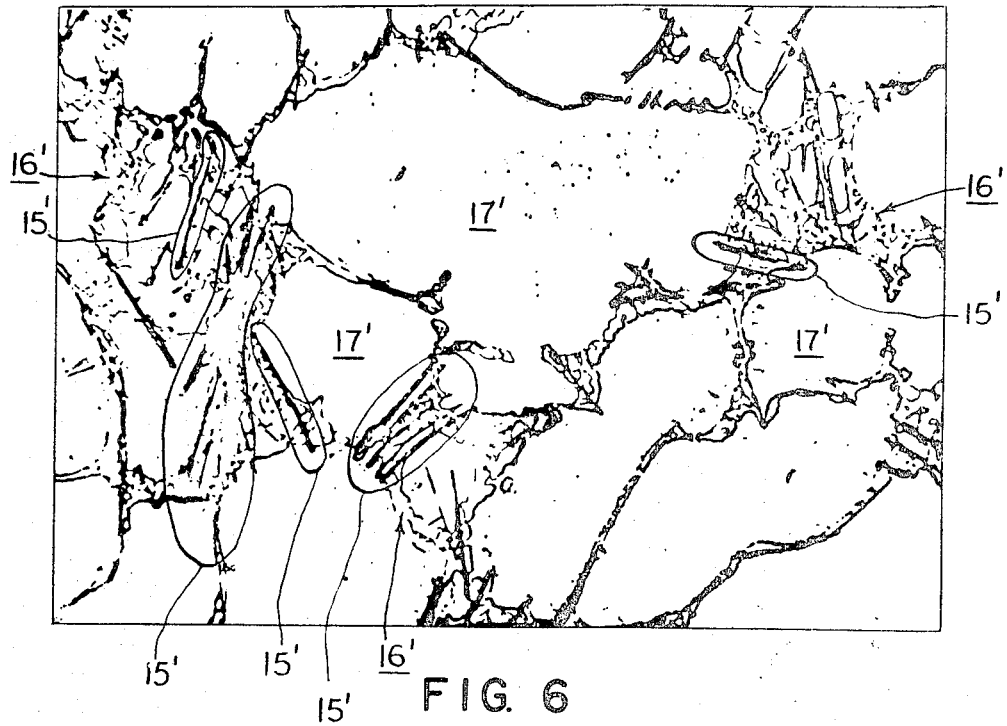
Figure 7:
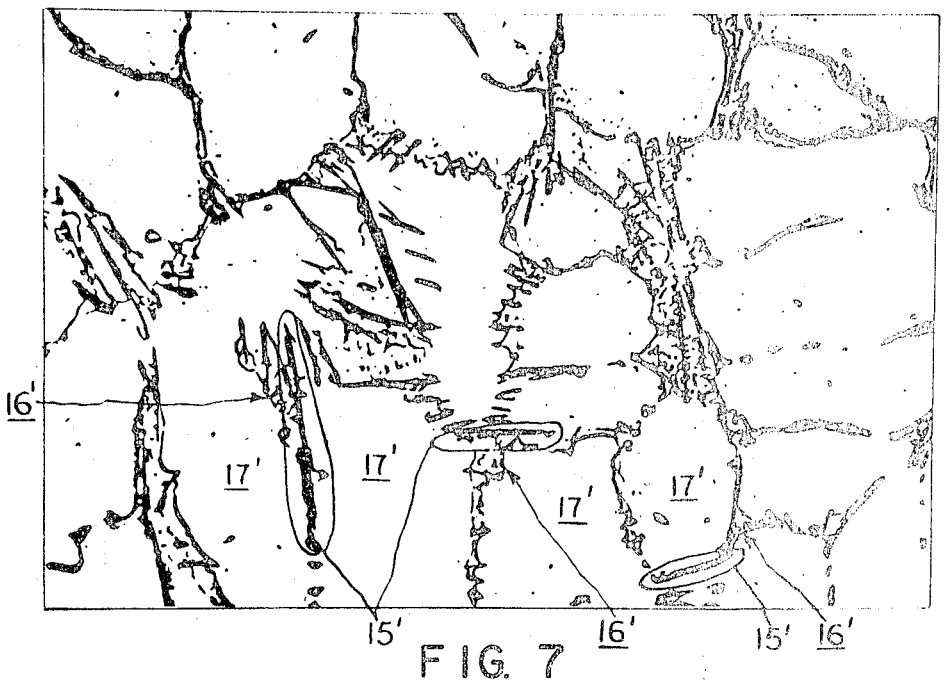
Figure 8:
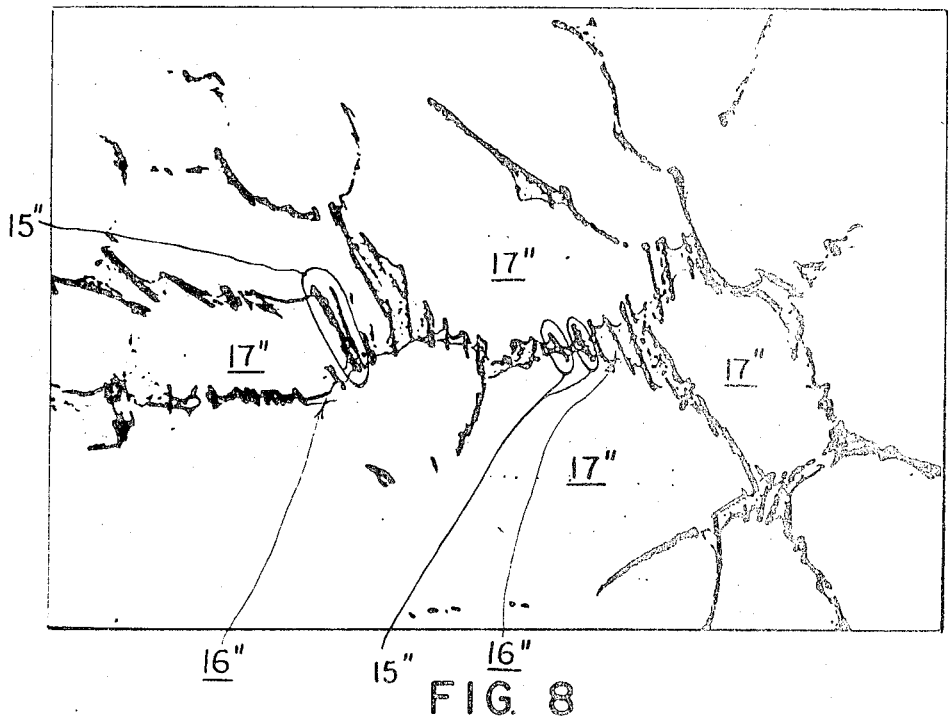

FIG. 5 is an 800X enlargement of the microstructure of the fusion zone of an improved aluminum-copper alloy parent stock a.c. welded using a filler rod of the same composition and including silicon carbide fibers of about 3 microns diameter, FIG. 6 is an 800X enlargement of the microstructure of an improved aluminum-copper alloy as cast in a machined graphite mold and including about 0.06 percent of silicon carbide fibers of about 3 microns diameter;

FIG. 7 is another 800X enlargement of the microstructure of an improved aluminum-copper alloy as cast in a machined graphite mold and including about 0.06 percent of silicon carbide fibers of about 3 microns diameter; and FIG. 8 is an 800X enlargement of the microstructure of an improved aluminum-copper alloy solutionized one hour at 990° F. and water-quenched, exhibiting silicon carbide fibers at about 3 microns diameter which comprise about 0.06 percent of the composite material.

Figure 1:
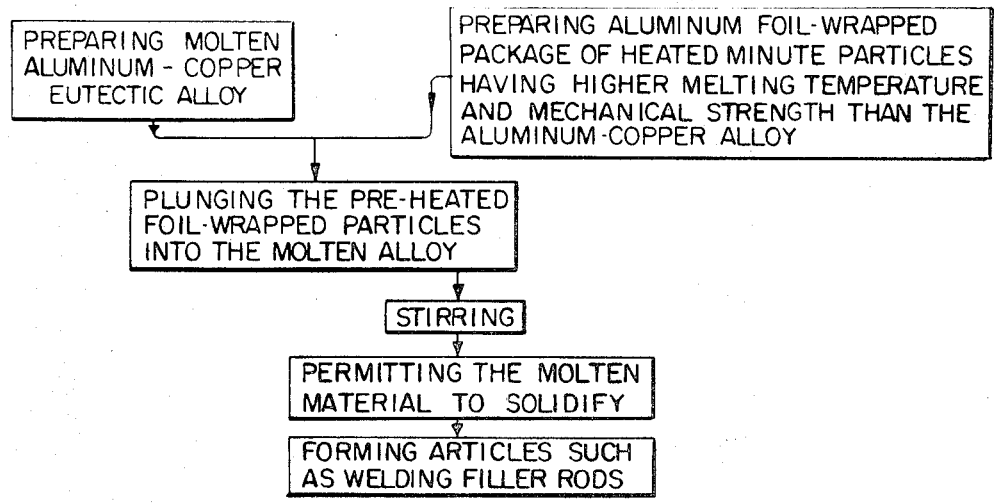

In the preparation of the lightweight aluminum-copper "eutectic" alloy, such as one including about 4.5 percent by weight of copper and which will on solidification exhibit tendencies for grain growths to occur with liquid eutectic of the constituents present at the same time, a degassed quantity of the molten alloy is produced (FIG. 1) in the usual way with conventional equipment. In addition, a relatively small quantity (example: 0.06 to 0.30 percent by weight of the total) of minute reinforcement particles having higher melting temperatures than that of the molten alloy (example: substantially refractory material) is also prepared. For purposes of the present invention, these particles are desirably elongated or acicular, and have the appearance of fibers or whiskers, although they are only of exceeding small transverse cross section (typically, 3 to 30 microns across) and may have random lengths of only about 0.5 to 1 mil. Particles such as aluminum oxide ($Al_2O_3$), and silicon carbide (SiC), and aluminum nitride-oxide crystals, which are readily wetted by the alloy, are highly satisfactory, and may be used singly or in combination. The production of these particles may be realized in accordance with known techniques. Preferably, the batch of reinforcement particles is packaged within a thin foil wrapper, such as an aluminum foil which is compatible with the alloy under discussion and which will melt away shortly after being immersed in the molten alloy, and the entire package is heated to prevent too large a thermal gradient from appearing when it is next plunged deeply into the molten alloy with the aid of a suitable tool. A stirring operation follows, with the object of dispersing the wetted particles rather uniformly throughout the melt, although this need not be a particularly thorough procedure if the particles are readily wetted by the alloy and if they do not tend to group and settle or float. Particles which are not likely to be wet easily may first be precoated with another material which promotes such wetting with whatever alloy is being processed.

Once the reinforcement particles have been introduced into the molten alloy, it is permitted to cool and solidify at a normal rate, preferably as a casting in a mold into which it has been poured (such as a machined graphite mold for the aluminum-copper alloy under discussion). The solidified composite material may then be rolled, swaged or otherwise wrought and formed into desired shapes with significantly improved characteristics attributable to the presence of the reinforcement particles primarily at the sites of grain boundaries. In addition, the aforementioned aluminum-copper alloy with reinforcement particles may be shaped into welding filler rods and used in welding aluminum parts, with or without such reinforcement particles in them, to produce high-strength crack-free weldments. Importantly, moldings of complex configurations are significantly improved in that the risks of encountering the usual hot tearing at corners are greatly reduced.

The altered properties of the alloy including the minute particles are remarkable in view of the small percentages of particles involved and because of the apparent absence of any alloying effects or gross mechanical-locking effects (such as would be expected with substantial amounts of large fibers or material akin to steel wool). The particles do not merely serve as filler, to augment the volume of the resulting product, but, instead tend to be, and are small enough to be, localized substantially uniformly along grain boundaries, where they evidently impede grain boundary sliding and dislocation cross slip. It is theorized that once the fine particles have been introduced into the melt, and the molten material commences solidification upon gradual cooling, grains of the alloy tend to grow while other amounts of the alloy having lower eutectic solidification temperatures are present between the growing grains. This accords with known eutectic characteristics for alloys which do not have a predetermined proportion of constituents promoting a single lowermost eutectic temperature for solidification of the alloy. The fine particles are apparently automatically forced into the grain boundary regions where liquid phases of the alloy are present during the solidification process, being rejected by the growing grains, until, upon solidification of the entire mass, they are trapped in place at the grain boundary regions. Beneficial effects are promoted at high temperatures at which the alloy alone would be relatively weak structurally. Rolling of the improved aluminum-4.5 percent copper alloy, with the silicon carbide and with the aluminum oxide particles, from a thickness of about 0.75 inch to about 0.025 inch produced a smooth sheet free from defects, while the same alloy without the particles developed cracks and was irregular in appearance after rolling to the same extent. The same grain boundary reinforced material, especially with silicon carbide exhibits highly improved as cast properties, being very advantageously free of hot tears. Welding filler rods including the particles and used in a.c. arc welding of ⅛ inch aluminum sheet produced crack-free welds, with tensile test failures occurring in the material adjacent the welds rather than in the weld itself, whereas like welding with the usual filler material (a filler metal commonly known in the trade as "4043") resulted in failures in the weld. Remelting may be performed other than in the course of welding, with the resulting products also exhibiting improved properties, such that the composite materials may be prepared as ingots or the like for subsequent remelting and molding or other processing.

Certain of the physical properties of a conventional aluminum-4.5 percent copper alloy, designated as the Control, are compared with those of the same alloy including fibers of reinforcement materials in the tabulations which follow.

A. Properties as-cast in machined graphite molds:

| | 2% yield, k.s.i. | Ultimate tensile strength, k.s.i. | Percent elongation | Rockwell Hardness, $R_F$ |
|---|---|---|---|---|
| 1. Control | 8.7 | 21.0 | 4 | 51 |
| 2. $Al_2O_3$ fibers (0.06% by wt.) | 17.3 | 21.7 | 1 | 65 |
| 3. SiC fibers (0.06% by wt.) | 15.2 | 24.3 | 7 | 59 |
| 4. Aluminum nitrideoxide crystals (0.08% by wt.) | 12.5 | 26.8 | 11.6 | 61 |

B. Properties in solutionized condition (990° F. for 1 hour, water quenched):

| | 2% yield, k.s.i. | Ultimate tensile strength, k.s.i. | Percent elongation | Rockwell Hardness, $R_F$ |
|---|---|---|---|---|
| 1. Control | 12.4 | 21.2 | 3 | 66 |
| 2. $Al_2O_3$ fibers (0.06% by wt.) | 15.3 | 19.4 | 1 | 75 |
| 3. SiC fibers (0.06% by wt.) | 15.0 | 24.3 | 9 | 79 |

C. Properties in aged condition (300° F. for 3 hours):

| | 2% yield, k.s.i. | Ultimate tensile strength, k.s.i. | Percent elongation | Rockwell Hardness, $R_F$ |
|---|---|---|---|---|
| 1. Control | 32.7 | 33.0 | 3.8 | |
| 2. $Al_2O_3$ fibers (0.06% by wt.) | 25.5 | 31.9 | 1.0 | 92 |
| 3. SiC fibers (0.06% by wt.) | 29.6 | 37.4 | 2.0 | 93 |
| 4. Aluminum nitrideoxide crystals: | | | | |
| a. 0.08% by wt | 25.5 | 32.4 | 2.5 | |
| b. 0.3% by wt | 29.2 | 43.0 | 2.5 | |

The alumina fibers used in these evaluations were of diameters about 10—30 microns, in random lengths (example: about 1 mil), and the silicon carbide fibers were of diameters about 3 microns in random lengths (example: about 0.5 mil). The Rockwell hardness scale was that for a 1/16 inch diameter ball and a 60 kg. load.

Aluminum alloy sheets (aluminum-copper alloy of the type designated in the trade as "5052") of dimensions 6 x 6 x ⅛ inch were manually heliarc welded with (1) the aforementioned type "4043" filler rods; (2) filler rods of aluminum-4.5 percent copper including 0.1 percent $Al_2O_3$ whiskers (about 10—30 microns diameter); and (3) filler rods of aluminum-4.5 percent copper including 0.1 percent SiC whiskers (about 3 microns diameter). Items 2 and 3 were first cast as 9/16 inch diameter bars and then rolled to 1/32 inch thickness for use as the filler rods. Welds made with the latter filler rods were crack-free, while those produced with a similarly made filler rod of aluminum-4.5 percent copper developed cracks during welding (probably because of the high short tendency of the alloy). The fiber-containing alloy has a reduced hot tearing tendency, which was found to be the case for both casting and welding. Finished welds made with filler rods 1—3 were machined flat, and samples were cut transverse to the weld zone and notched at the edges of the welds; results of the ultimate notch tensile strength were as follows:

| Filler rod: | Ultimate tensile strength, k.s.i. |
|---|---|
| 1. "4043" | 25.6 |
| 2. Al-4.5, Cu+0.1% SiC | 29.1 |
| 3. Al-4.5, Cu+0.1% $Al^2O^3$ | 29.0 |

In addition to edge-notched samples, unnotched standard machined bars taken transverse to the weld were tested with results as follows:

| Filler rod | Yield (p.s.i.) | Ultimate tensile strength, (p.s.i.) | Percent elon- ration | Failure location |
|---|---|---|---|---|
| 1........ "4043" ........ | 15,380 | 26,530 | 3.1 | Weld. |
|  | 15,270 | 31,090 | 7.8 | Do. |
|  | 15,710 | 28,970 | 5.4 | Do. |
| 2........ Al-4.5, Cu+0.1% SiC ........ | 16,210 | 33,430 | 10.1 | Base total. |
|  | 15,380 | 31,020 | 10.9 | Do. |
|  | 15,750 | 31,050 | 10.9 | Do. |
| 3........ Al-4.5, Cu+0.1% Al₂O₃ ........ | 16,080 | 33,700 | 9.3 | Do. |
|  | 15,790 | 31,140 | 10.9 | Do. |
|  | 15,570 | 30,280 | 10.9 | Do. |

These data indicate that the welds made with the composite fiber-containing alloy were stronger than the adjoining base metal merely affected by the heat of welding. Radiographic examinations of the welds made with the fiber-containing material confirmed that they were free of cracks.

Figure 2:
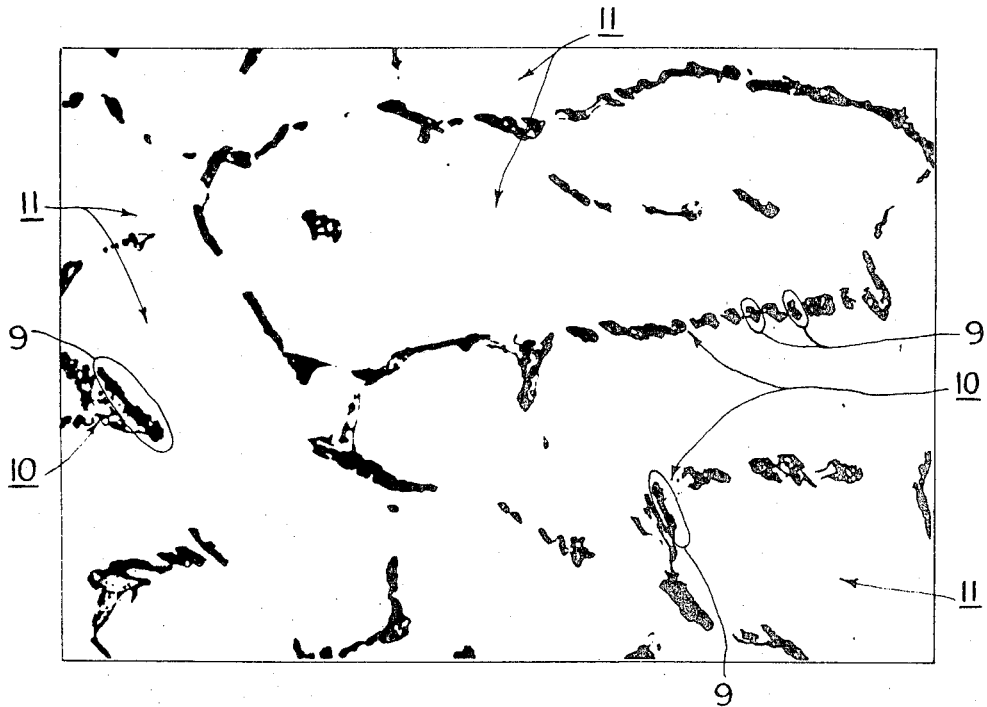
FIG. 2 is an 800X enlargement of the microstructure of an improved aluminum-copper alloy including about 0.08 percent of aluminum nitride-oxide crystals.
Figure 3:
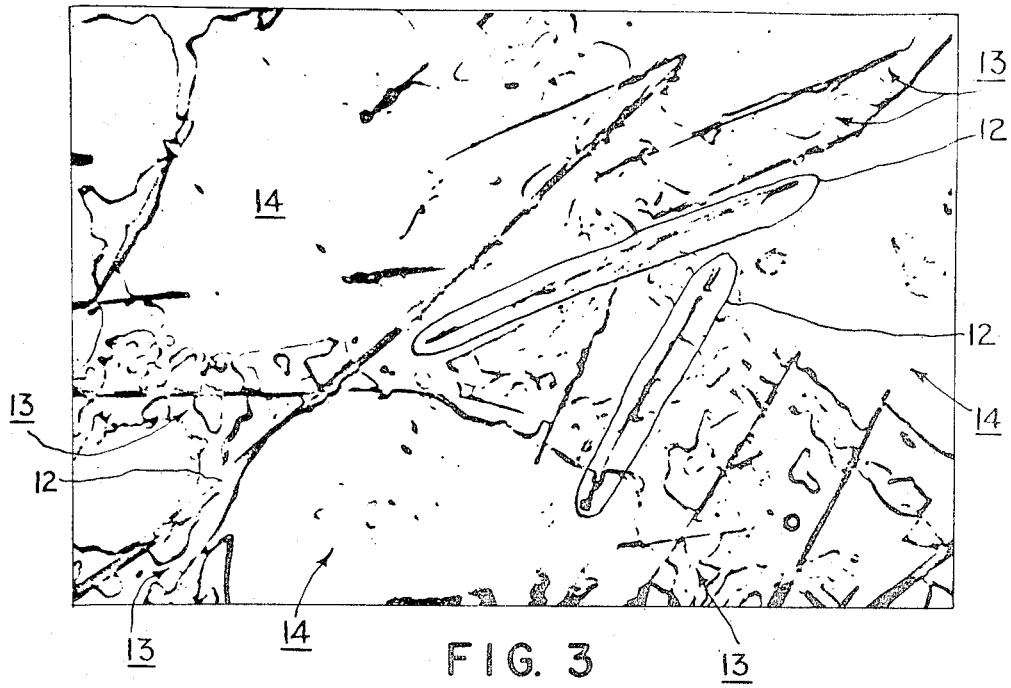
FIG. 3 is an 800X enlargement of the microstructure of an improved aluminum-copper alloy as cast in a machined graphite mold and exhibiting aluminum oxide fibers of about 10-—30 microns diameter at the grain boundaries.
Figure 4:
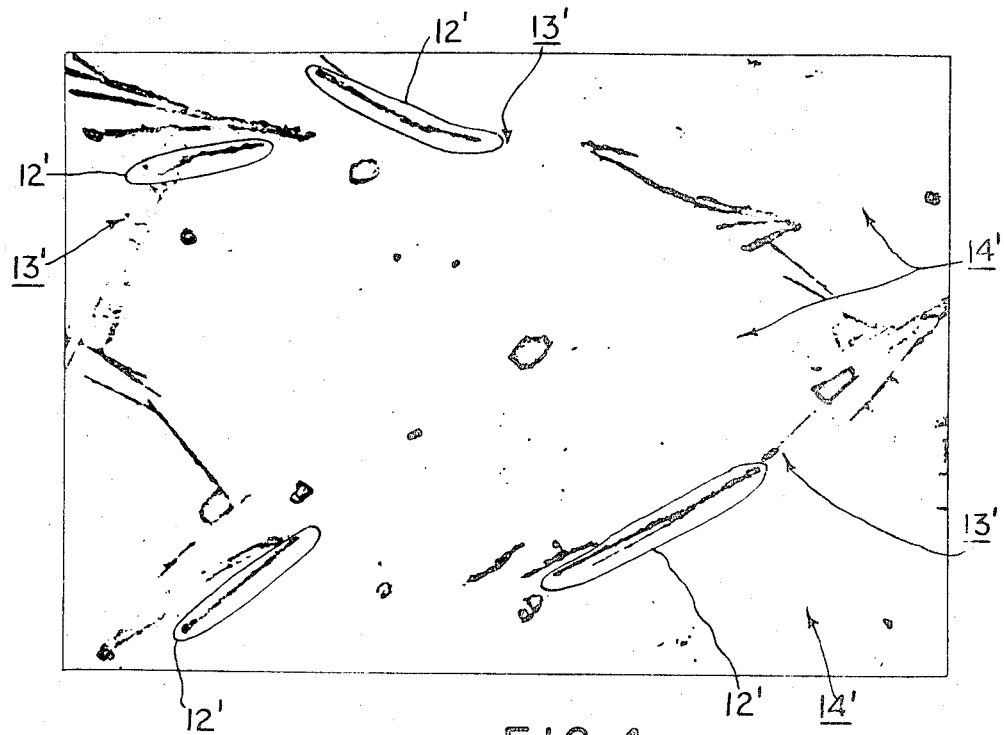
FIG. 4 is an 800X enlargement of the microstructure of an improved aluminum-copper alloy solutionized 1 hour at 990° F. and water-quenched, exhibiting aluminum oxide fibers of about 10—30 microns diameter at prior grain boundaries.

Enlargements (800X) of etched surfaces of composite aluminum-copper alloys appear in FIGS. 2 through 8, the alloy in each instance including the currently-popular 4.5 percent by weight of copper, and Keller's etch being used in preparing the surfaces for examination. In FIG. 2, the aluminum nitride-oxide crystals, 9, are evident in substantially uniform dispersals at the grain boundary "eutectic" regions, 10, between various dendrite-studded crystals or grains 11. Solutionizing and aging have reduced the prominence of the grain boundary regions. The 10—30 micron diameter aluminum oxide fibers 12 in FIG. 4 are highly elongated while nevertheless being oriented essentially within the boundary regions 13 where the high-copper content eutectic was the last to solidify between the high-aluminum content dendritic grains 14. Solutionizing of a like product for one hour at 990° F., and water-quenching, reduced prominence of the boundaries but left the aluminum-oxide particles 12' at the sites 13' of prior grain boundaries between the grains 14'.

In FIG. 5, silicon carbide fibers 15, of about 3 microns diameter appear at the grain boundaries 16 of a fusion zone where a composite filler rod was used to weld (manual TIG a.c. welding) a similar stock of material. The fibers have reappeared at the boundaries between the high-aluminum content masses 17 in about the same relative concentration as they occurred in the rod and stock before welding. Similar silicon carbide fibers 15' are shown in the boundaries 16' between grains 17' of a like alloy, as cast in a machined graphite mold in FIGS. 6 and 7. The FIG. 8 illustration is of a like alloy, also with the substantially 3 micron diameter silicon carbide fibers, 15'', after being solutionized 1 hour at 990° F. and water quenched. The boundary sites 16'' between grain masses 17'' are reduced in size because of the solutionizing.

Practice of these teachings need not be restricted to the materials specified, provided the reinforcement particles are of appropriate sizes and refractoriness in relation to the host metal involved, and provided they can be wet sufficiently. In general, a length-to-diameter ratio of between about 100—2,000 is desired for these particles, which may typically run about 3 to 30 microns in approximate transverse dimensions, or "diameters". The most attractive particles currently, from the standpoint of cost, are the aforementioned alumina, silicon carbide, and aluminum nitride-oxide, which also have the other desirable properties referred to hereinabove. However, other less commonly available particles, such as those of gra-phite, magnesium oxide, and refractory or ceramic materials, have properties which made them attractive for such use, and coating techniques (on iron particles, for example) may be resorted to in improving wetability and preventing undesirable alloying or other deteriorations of the particles in appropriate instances. Similarly, the host alloys need not be restricted to the aluminum-copper alloy which has been discussed and illustrated in detail for purposes of setting forth the currently preferred embodiments and expressions of these teachings. For example, an alloy of aluminum and 10 percent by weight of silicon is found to produce the same type of grain-boundary orientations of all of the same fibers (namely, alumina, silicon carbide, and aluminum nitride-oxide). Although "eutectic" and grain-growth actions have been alluded to in venturing an explanation for the unique phenomena which appear to be involved, it should also be recognized that other metallurgical explanations involving the growth of solid masses with surrounding liquid phase material speak of dendrite formations, as in the case of nickel-copper alloys, and that the "boundaries" in such a case can serve as sites for entrapment of the reinforcement particles. Orientations of grain boundaries in preferred directions, as by so-called "planar freezing" techniques, will have the effect of giving preferred directional orientations of the fibers trapped there, also.

Although specific practices have been described, and preferred embodiments and materials have been discussed, it should be understood that various modifications, substitutions, and additions may be effected by those skilled in the art without departure from these teachings, and it is aimed in the appended claims to embrace all such variations as fall within the true spirit and scope of this invention.

I claim:

1. The process of forming welds between parts of aluminum-containing metal which comprises arc welding the said parts together with a filler rod comprising an alloy consisting essentially of aluminum and a relatively small percentage of copper and further including elongated particles of substantially refractory material selected from the group consisting of alumina, silicon carbide, and aluminum nitride-oxide, said elongated particles being of the order of about 0.06 and 0.3 percent by weight of the filler rod and having cross-sectional dimensions of the order of between about 3 and 30 microns, said particles being distributed substantially uniformly throughout the rod and weld primarily throughout the regions of substantially liquid-phase boundaries occurring between minute substantially solid-phase masses of the alloy during solidifications thereof.

2. The process of forming welds between parts of aluminum-containing material as set forth in claim 1 wherein said arc welding comprises arc welding together the said parts having substantially the same distribution and percentage by weight of the same elongated particles therein.